United States Patent [19]

Jaeger

[11] 4,215,186
[45] Jul. 29, 1980

[54] BATTERY PLATE SEPARATOR AND BATTERY CONTAINING THE SAME

[76] Inventor: Ben E. Jaeger, Rt. 2, Box 49, Plano, Ill. 60545

[21] Appl. No.: 15,472

[22] Filed: Feb. 26, 1979

[51] Int. Cl.² .......................................... H01M 2/16
[52] U.S. Cl. .................................. 429/139; 429/254; 429/145
[58] Field of Search ............... 429/131, 136, 139, 144, 429/254, 145, 133, 40, 41, 253

[56] References Cited

U.S. PATENT DOCUMENTS

| | | | |
|---|---|---|---|
| 2,157,629 | 5/1939 | Rolph | 429/136 |
| 3,013,100 | 12/1961 | Mendelsohn et al. | 429/139 |
| 3,228,802 | 1/1966 | Rabl | 429/145 |
| 3,442,717 | 5/1969 | Horn et al. | 429/139 |

FOREIGN PATENT DOCUMENTS

| | | | |
|---|---|---|---|
| 727202 | 2/1966 | Canada | 429/139 |
| 2008982 | 9/1971 | Fed. Rep. of Germany | 429/136 |
| 644380 | 10/1950 | United Kingdom | 429/131 |

Primary Examiner—Donald L. Walton
Attorney, Agent, or Firm—Gary, Juettner & Pyle

[57] ABSTRACT

A battery plate separator is characterized by polypropylene filter media material which is readily formed into pouches for receiving and encapsulating battery plates. The separator enables a free flow of electrolyte ions between adjacent plates while simultaneously preventing electrode dendrite penetration therebetween, is highly resistant to deterioration in the presence of electrolytes normally encountered in batteries, significantly extends the life of batteries constructed therewith, and provides a very thin yet highly efficient wrapping around the plates so that a greater number of plates may be packaged into a battery of given size for increased battery capacity.

17 Claims, 4 Drawing Figures

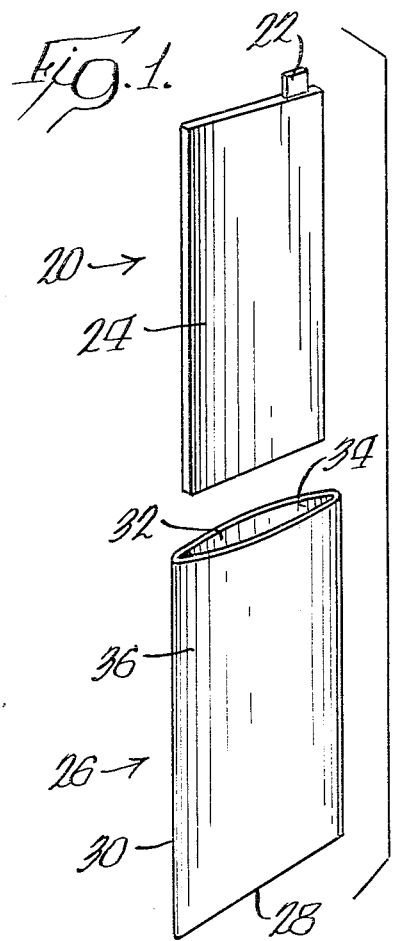
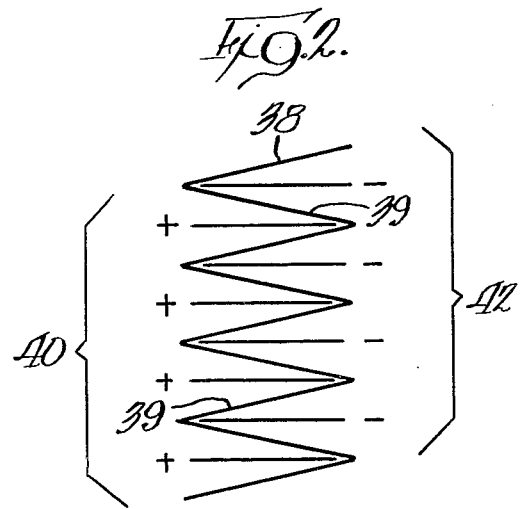
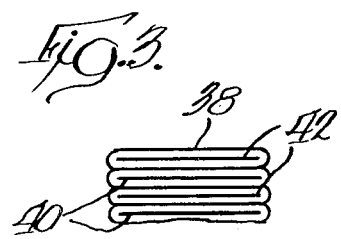
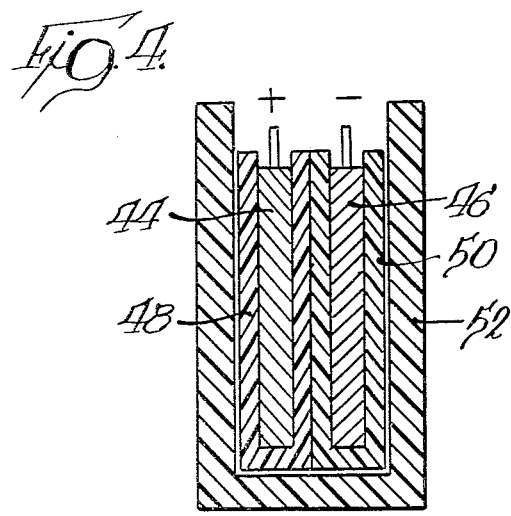

BATTERY PLATE SEPARATOR AND BATTERY CONTAINING THE SAME

BACKGROUND OF THE INVENTION

The present invention relates to an improved polypropylene filter media separator for battery plates and to batteries containing the same.

Battery plates for industrial or automotive storage batteries of the lead acid type are conventionally manufactured by casting a grid structure in a mold. The grid usually comprises a rectangular frame formed with openings, and a laterally projecting conductive lug on its periphery by means of which a plurality of grids of similar polarity may be fused together or otherwise electrically connected in parallel as by a bar leading to a battery post. The grid is coated with an active material paste of lead oxide containing some sulphuric acid, whereafter it is heated to dry and somewhat solidify the paste. The resulting structures, called battery plates, are then subjected to an electrical charge while in sulphuric acid, whereby one group of plates called the negative plates have their lead oxide converted to lead, and another group of plates called the positive plates have their lead oxide converted to lead dioxide.

To prevent shedding of the active material coating from the battery plates when the same are used in a battery, each plate is wrapped or encased in a separator material which ideally on the one hand securely retains the coating on the plate, while on the other hand allows unimpeded electrochemical action of the plate when formed with one or more additional plates into a battery. Conventionally, each plate is wrapped in a separator material which is usually of fiberglass. To this end, a fiberglass mat is folded around the plate, and to hold the mat in position on and against the plate a plastic "foot" or sheet of material is folded around the bottom of the plate and mat, and an overlay sheet of perforated plastic is folded around the mat and foot lengthwise of the plate. Ends of the outer sheet of plastic material are then overlapped and joined, for example by heat sealing, to complete the assembly. The wrapping process is a manual operation, and is quite undesirable since fiberglass is a relatively hazardous material to handle and work with.

A series of wrapped plates is then placed in a cell with alternating negative and positive plates and a separator, which may be of fluted wood, perforated rubber, cork, plastic material or the like, is positioned between adjacent pairs of plates. The cell may comprise any number of plates, with the positive plates being connected in parallel and the negative plates being connected in parallel, so that the entire cell has a desired amperage rating. A requisite number of cells are then inserted into a container which forms the outer housing of the battery, the cells are connected in series, a cover is installed on the container and electrolyte is introduced therein to complete the battery.

Manifestly, battery plate assemblies and the resulting batteries of the type described are not only difficult, time consuming and tedious to construct, but also present a serious hazard to health because of the required manual handling of the fiberglass separator material. In addition, the plate assemblies have a significant overall thickness comprised of the combined thicknesses of the battery plates themselves, the fiberglass mat, the plastic foot, the outer plastic wrapping sheet, and the individual separators placed between adjacent pairs of plate assemblies, which severely limits the number of plates that may be packaged in a battery of given size, and therefore the capacity of the battery.

OBJECTS OF THE INVENTION

An object of the present invention is to provide an improved separator for battery plates which is easily assembled with a battery plate without hazard to health.

Another object of the invention is to provide such a separator which minimizes the thickness dimension of the assembled separator and battery plate, whereby maximum numbers of battery plates may be placed in a battery container of given size to maximize the capacity of the battery.

A further object of the invention is to provide such a separator for battery plates which enables a free flow of electrolyte ions between the plates, prevents electrode dendrite penetration therebetween, and significantly extends the life of a battery constructed therewith.

A still further object of the invention is to provide a battery which is constructed with such battery separators.

SUMMARY OF THE INVENTION

In accordance with the present invention, a separator for battery plates comprises a filter media material formed into an open ended pouch for receiving therein a battery plate with a conductive lug of the plate extending through the open end of the pouch. With a plurality of battery plates within such separators interleaved to alternate negative and positive plates in the formation of a battery cell, the separator very effectively prevents shedding of active material on the plates, yet enables a free flow of electrolyte ions between the plates for efficient operation of the cell while simultaneously preventing dendrite penetration between the plates.

In another embodiment of the invention the filter media material is formed into a zig zag pattern and joined along its side and bottom edges to define a plurality of adjacent open ended pouches. In use of the separator to form a battery cell, battery plates are placed into the pouches through the open ends thereof to alternate plates of positive and negative polarity. As with a cell formed with battery plates placed in separator filter media material pouches, in use of the zig zag pattern of separator material the separator prevents shedding of the active material on the plates, yet enables an efficient transfer of electrolyte ions between the plates while simultaneously preventing dendrite penetration therebetween. In addition, the zig zag pattern provides for minimum dimensions of the assembled plates, since only a single layer of separator material extends between adjacent plates. Thus, the separator enables an increased number of plates to be assembled into a battery of given size, thereby increasing the capacity of the battery.

Preferably, the filter media separator material is a thermoplastic material which is heat sealable or fusible, so that sheets of the same may readily be formed into individual battery plate receiving pouches or into the zig zag pattern which defines the plurality of pouches. A particularly advantageous separator material is a needled polypropylene fabric, one side of which is relatively porous and forms a high micron filter, and the other side of which is calandered, relatively dense and forms a low micron filter. In use of such fabric it has been found that placement of the porous side of the fabric against the active paste material on the battery plate quite effectively prevents shedding of the same, while the relatively dense side provides a very efficient filter which prevents the passage of paste material and the formation of electrode dendrites between adjacent plates, yet freely allows electrolyte ions to traverse between the plates for efficient electrochemical operation.

Thus, in the manufacture of the polypropylene needled fabric into separate battery plate pouches, the porous side of the fabric is positioned to form inner wall areas of the pouch for uniformly engaging and retaining the active material of the battery plate, while the dense side of the material forms the outer surface of the pouch for efficiently preventing any migration of active material and electrode dendrite penetration between adjacent plates.

For the zig zag pattern of separator material defining a plurality of adjacent pouches, however, only alternate ones of the pouches would have inner wall areas formed by the porous side of the fabric, while the remaining pouches would have inner wall areas formed by the calandered side. In this case, positive battery plates are preferably placed in those pouches having inner walls defined by the porous side of the fabric, and negative plates in the other pouches, since it has been found that in use of battery plates the positive plate material deteriorates and sheds more readily than does the negative plate material. On the other hand, to optimally protect the paste material on both the positive and the negative plates, in accordance with another embodiment of the invention two sheets of polypropylene fabric are joined with their dense surfaces back to back prior to formation of the zig zag pattern of pouches, and in a further embodiment a single sheet of polypropylene fabric having a relatively dense layer sandwiched between outer relatively porous layers is formed into the zig zag pattern of pouches, whereby all of the pouches have relatively porous inner surfaces for uniformly engaging the active material on all of the plates. In any event, in the resulting zig zag pattern of pouches at least one high density surface of the separator fabric is positioned between each pair of adjacent pouches, thereby preventing the transfer of active plate material between packaged plates and shorting of the plates.

The invention also contemplates a battery constructed with battery plate separators as above described.

The foregoing and other objects, advantages and features of the invention will become apparent upon a consideration of the following detailed description, when taken in conjunction with the accompanying drawings.

BRIEF DESCRIPTION OF THE DRAWINGS

FIG. 1 is a perspective assembly view of a pouch formed of battery plate separator material in accordance with one embodiment of the invention, and of a battery plate positioned for being inserted therein.

FIG. 2 is a top plan view of battery plate separator material formed into a zig zag pattern in accordance with another embodiment of the invention, and of a plurality of battery plates positioned within folds of the pattern to alternate plates of positive and negative polarity;

FIG. 3 is a top plan view showing the zig zag pattern of separator material of FIG. 2 joined or sealed along its edges to form a plurality of adjacent open ended pouches containing the battery plates therein, and FIG. 4 is a cross sectional, side elevation view of a battery constructed with a pair of plates packaged within pouches of battery separator material in accordance with the teachings of the invention.

DETAILED DESCRIPTION

Referring to FIG. 1, there is indicated generally at 20 a battery plate of a type which may advantageously be used in a lead-acid storage battery of the industrial or automotive type. The plate comprises a generally rectangular grid or frame which may be of lead, and has a laterally projecting lead lug 22 on its periphery by means of which a plurality of grids of similar polarity may be fused together or otherwise electrically connected in parallel as by a bar leading to a battery post. In the manufacture of the grid into the battery plate 20, the surface of the grid is provided with a paste of lead oxide 24 containing some sulphuric acid. A plurality of such grids are then heated and dried to solidify the paste, and are later subjected to an electrical charge while in sulphuric acid, whereby one group of plates called the negative plates have their lead oxide converted to lead, and another group of plates called the positive plates have their lead oxide converted to lead dioxide. A series of plates is then placed in a cell with alternating negative and positive plates. A cell may comprise any number of plates, with the positive plates being connected in parallel and with the negative plates being connected in parallel, so that the entire cell has a desired amperage rating. Depending upon the required voltage for the battery, a requisite number of cells are then connected in series within a container for the battery, and the container is filled with an electrolyte solution.

As is well known, in use of battery plates, especially storage battery plates of the lead-acid type, it has been found that the active paste material of lead or lead dioxide more or less readily disintegrates and tends to fall from the plates to accumulate in the bottom of the cell, and electrode dendrites tend to grow between adjacent plates. It has furthermore beeen found that if the plate is wrapped or encapsulated within a separator material properly constructed from a substance permeable to the electrolyte and which does not interfere with the traverse of ions between the plates, the active material may be retained mechanically in position on the plate while the electrochemical action of the battery is unimpeded. Accordingly, battery plates for batteries of the storage type are customarily encased in and separated from each other by separator material.

In accordance with a common conventional practice, the active plate material is held in place by a sheet of fiberglass separator material wrapped around the plate. In this case, a fiberglass sheet is first wrapped around the plate, a first sheet or "foot" of plastic is then folded over a lower end of the plate, whereafter a second and outer perforate plastic sheet is wrapped lengthwise of the plate around the entirety of the fiberglass and foot to hold the same in position on the plate. This wrapping process is a manual operation, and is not only time consuming and expensive, but is also quite undesirable since fiberglass is a relatively hazardous material to work with and handle.

The present invention improves upon prior art battery separators, and provides a separator formed of a nonfiberglass, filter media material which is highly effective in retaining the active material or paste on a battery plate, prevents the formation of electrode dendrites between the plates, and yet enables free passage of electrolyte ions between the plates for efficient operation of a battery. In addition, the separator is readily formed into battery plate packages separate from the plates, and results in minimum thickness dimensions of packaged plates so that increased numbers of plates may be contained in a battery of given size for an increased capacity of the battery. The separator material desirably is a plastics filter media material, and advantageously a thermoplastic material in order that the same may efficiently be both heat severed and heat sealed to readily form battery plate separator pouches into which battery plates may easily and conveniently be inserted in the manufacture of a battery.

Particular advantages have been obtained with use of a filter media material comprised of a needled polypropylene fabric. With such a fabric, fibers are randomly placed into and on opposite sides of a central grid or screen, which may be of nylon. It is the fiber, not the grid, which does the filtering, and random fiber placement gives excellent flow characteristics. Advantageously, the placement of the fibers into the screen is such that one side of the screen is provided with a relatively porous overlay which forms a high micron filter while the opposite side has a relatively dense and calandered overlay which forms a low micron filter. Polypropylene fibers are chemically resistant to most electrolytes including sulphuric acid, so that the resulting separator is extremely durable and provides a long working life, a high filtration efficiency, and exceptional ion migration throughput for increased battery efficiency.

Particular advantages have been derived when the battery separators of the invention are formed of a needled polypropylene fabric sold by Globe Albany Corp. under Style No. 169R. In that fabric, polypropylene fibers are needled into on opposite sides of a central supporting screen or grid, and there are any number of combinations of fiber size, length, orientation and density on each of the two sides. In addition, the fabric may be processed in various manners which would include, for example, compacting and selective surface modification of the fibers so that the fabric may be most effectively and optimally used to encapsulate or surround battery plates. Such a polypropylene fabric is also severable and fusible through the application of heat, whereby the fabric may readily and economically be manufactured into suitable configurations for use with battery grids of any particular shape and/or arrangement.

Referring yet to FIG. 1, there is shown in accordance with one embodiment of the invention a battery separator of polypropylene fabric which has been configured into an open ended pouch, indicated generally at 26, for receiving the battery plate 20 with the lug 22 extending through the open end. The pouch economically is formed of a sheet of polypropylene fabric folded across itself and sealed along a bottom edge 28 and a side edge 30 to define an open upper end 32. Advantageously, the polypropylene fabric has a relatively porous high micron filter side 34 and a relatively dense low micron filter side 36, and is folded so that the porous side defines the inner wall areas of the pouch and the dense side outer wall areas. In this manner, with the battery plate inserted in the pouch the porous side of the fabric tightly and uniformly engages and holds the active material on the plate to prevent shedding of the same. At the same time, when the packaged plate is assembled with a plurality of other plates into a battery cell, the relatively dense outer side of the fabric prevents migration of active material and formation of electrode dendrites between adjacent plates, yet enables a free flow of electrolyte ions therebetween.

In use of the separator pouches, a plurality of battery plates packaged in such pouches are interleaved to alternate plates of negative and positive polarity in the formation of a battery cell, with the outwardly extending lugs of the plates of like polarity being interconnected. The separators then absolutely retain the active material against the plates, prevent electrode dendrite formation between adjacent plates, and yet allow a free flow of electrolyte ions for maximum efficiency of the cell. It is to be appreciated, of course, that since each battery plate is surrounded by only a single layer of separator fabric, that the assembled plate and separator has an overall thickness which is considerably less than that of a plate conventionally wrapped with a fiberglass sheet and two sheets of plastic material, so that a greater number of battery plates may be assembled into a battery container of given size for an increased capacity of the battery.

FIGS. 2 and 3 illustrate an embodiment of the invention wherein a single sheet of needled polypropylene fabric 38 defines a plurality of pouches for encapsulating positive and negative battery plates in a manner which forms a battery cell. In this case, as shown in FIG. 2 the fabric is first folded into a zig zag pattern to define a plurality of folds 39. Then, and as shown in FIG. 3, the outer side edges of the fabric at the ends of the folds, along with the bottom edges of the fabric, are joined together, such as by the application of heat, to define a plurality of side by side open end pouches for receiving therein in alternating polarity positive battery plates 40 and negative battery plates 42. The plates may be inserted into the pouches after fabrication of the separator or, as shown in FIG. 2, be positioned within the folds of the fabric prior to sealing the side and bottom edges thereof.

The zig zag separator arrangement has the advantage that only a single layer of polypropylene fabric is between each pair of adjacent plates, whereby the overall thickness of the assembly is even less than where the plates are packaged in separate pouches and maximum numbers of plates may be formed into a cell of given size, thereby further increasing the capacity of a battery in which the cell is used. However, a disadvantage is that since only one side of the polypropylene fabric is relatively porous, only the positive or only the negative plates may be engaged with the porous surface to prevent the shedding of active paste material therefrom, although dendrite penetration is prevented inasmuch as the relatively dense side of the fabric lies between adjacent pairs of plates. In this case, the battery plates preferably are arranged within the pouches so that the positive plates are encompassed by the porous side of the fabric, since it has been found that in use of such plates in a storage battery the positive plates deteriorate and shed their active material more readily than do the negative plates. Nevertheless, even with only the positive plates contained within the relatively porous sides of the fabric, the separator still results in a considerably longer life of a battery than when the plates are separated with a conventional fiberglass material.

In accordance with the other embodiments of the invention which overcome the aforementioned disadvantage, it is contemplated that the zig zag pattern of separator material comprise a pair of polypropylene fabric sheets positioned and joined with their dense sides back to back. This results in a separator material both sides of which are porous, so that when formed into pouches in the zig zag pattern each and every plate, both positive and negative, is uniformly engaged with a porous surface of the fabric. In the alternative, the separator material may be formed of a relatively dense inner layer of polypropylene fabric sandwiched between relatively porous outer layers of polypropylene fabric, whereby again the pouches will each have an inner porous surface. In any event, it is to be appreciated that with either of these embodiments a relatively dense layer of fabric will lie between adjacent plates, whereby migration of active plate material and formation of electrode dendrites between the plates is prevented.

FIG. 4 illustrates a battery constructed with the battery plate separators of the present invention. The battery includes a positive plate 44 and a negative plate 46 encapsulated within pouches 48 and 50, respectively, of filter media material, for example pouches of the type shown at 26 in FIG. 1. The plates with pouches are positioned within an outer container 52 of the battery, and the battery is filled with a suitable electrolyte, for example a dilute solution of sulphuric acid. It is apparent that the plates are completely separated from each other by the separators, so that migration of active plate material, formation of dendrite electrodes between the plates, and shedding of active plate material is prevented. In any event, should shedding of plate material occur, since the separators are sealed at their lower ends accumulation of material in the bottom of the battery container and subsequent shorting between the plates is absolutely prevented. Although the plates are shown as being contained within individual plate separator pouches 48 and 50, it is understood that the same could just as readily be contained within pouches formed by a zig zag pattern of plate separator material, such as that shown in FIGS. 2 and 3. In addition, for protection against dendrite electrode penetration at the upper ends of the packaged battery plates, it is contemplated that the upper edges of the pouches, whether the pouches are separate or formed by the zig zag pattern of material, be sealed together, except whereat the battery posts extend therebetween, to form substantially closed packages for the battery plates.

The invention thus provides improved separators for battery plates of the storage type. The separator material is nonfiberglass based, easy to handle and nonhazardous to health. Since the material is thermoplastic in nature, it is readily and economically heat severed and sealed for being manufactured into configurations for conveniently accommodating battery plates of any particular size and shape. The material may be formed into individual pouches for the plates, whereby a plurality of the plates may be separately assembled into a battery cell, or it may be formed in a zig zag pattern to provide a plurality of side by side pouches for accommodating a requisite number of plates. Where the material is a polypropylene filter media fabric having a relatively porous and a relatively dense side, with the porous side placed against the active material of the plates and the dense side separating adjacent ones of the plates, retention of active material on the plates is significantly enhanced while migration of the ctive material and formation of dendrites between adjacent plates is prevented.

While embodiments of the invention have been described in detail, various modifications and other embodiments thereof may be devised by one skilled in the art without departing from the spirit and the scope of the invention, as defined by the appended claims.

What is claimed is:

1. An improved battery plate separator, comprising an open ended pouch of plastics filter media material for closely receiving a battery plate therein, said plastics filter media material being a needled polypropylene fabric formed of a plurality of polypropylene fibers randomly placed into and on opposite sides of a central grid.

2. An improved battery plate separator as in claim 1, said plastics filter media material comprising a rectangular sheet of said needled polypropylene fabric folded in half to abut side edges thereof, two of said abutting side edges being heat sealed together to form said pouch.

3. An improved battery plate separator as in claim 1, said polypropylene fibers forming a relatively porous overlay and high micron filter on one side of said grid and a relatively dense, calandered overlay and low micron filter on an opposite side of said grid, said relatively porous surface being to the interior of said pouch and said relatively dense surface being to the exterior of said pouch.

4. An improved battery plate separator as in claim 1, including a plurality of said pouches connected side by side, adjacent pouches being connected along each of their side edges and each for closely receiving a battery plate therein.

5. An improved battery plate separator as set forth in claim 4, said pouches comprising an elongate rectangular sheet of said needled polypropylene fabric folded along its length back and forth upon itself in zig zag fashion to define a plurality of folds the otherwise open ends of which on three sides of said folded material are connected together to form within said folds said plurality of side by side connected pouches, said pouches being generally rectangular and each having three closed sides and one open side.

6. An improved battery plate separator as set forth in claim 5, said otherwise open ends of said folds being heat sealed together.

7. An improved battery plate separator as set forth in claim 5, said polypropylene fabric having a relatively porous surface on one side of said grid forming a relatively high micron filter and a relatively dense surface on an opposite side of said grid forming a relatively low micron filter.

8. An improved battery plate separator as set forth in claim 5, said elongate sheet of said needled polypropylene fabric comprising a pair of said sheets each having a relatively porous surface on one side of said grid forming a relatively high micron filter and a relatively dense surface on an opposite side of said grid forming a relatively low micron filter, said sheets being joined together back to back along their relatively dense surfaces.

9. An improved battery plate separator as in claim 5, said elongate sheet of needled propylene fabric having an inner layer of relatively dense polypropylene fibers and outer layers of relatively porous polypropylene fibers on opposite sides of said inner layer.

10. An improved battery plate assembly, comprising a pouch of plastics filter media material, and a battery plate in said pouch, said pouch closely surrounding the surfaces of said plate and said plastics filter media material being a needled polypropylene fabric formed of a plurality of polypropylene fibers randomly placed into and on opposite sides of a central grid.

11. An improved battery plate assembly as in claim 10, said polypropylene fibers forming a relatively porous overlay and high micron filter on one side of said grid and a relatively dense, calandered overlay and low micron filter on an opposite side of said grid, said relatively porous surface being to the interior of said pouch and said relatively dense surface being to the exterior of said pouch.

12. An improved battery plate assembly as in claim 10, including a plurality of said pouches and said battery plates side by side, wherein adjacent pouches are connected along each of their side edges and said battery plates are of negative and positive polarity and adjacent ones of said plates are of opposite polarity.

13. An improved battery plate assembly as in claim 12, said pouches comprising an elongate rectangular sheet of said needled polypropylene fabric folded along its length back and forth upon itself in zig zag fashion to define a plurality of folds the otherwise open ends of which on three sides of said folded material are connected together to form within said folds said plurality of side by side connected pouches, said pouches being generally rectangular and each having three connected sides and one open side for receiving said battery plates through said open sides and for retaining and closely engaging surfaces of said plates.

14. An improved battery plate assembly as in claim 13, said otherwise open ends of said folds being heat sealed together.

15. An improved battery plate assembly as in claim 13, said needled polypropylene fabric having a relatively porous surface on one side of said grid forming a relatively high micron filter and a relatively dense surface on an opposite side of said grid forming a relatively low micron filter so that alternate ones of said side by side pouches have inner surfaces formed of said relatively porous surface and the remaining pouches have inner surfaces formed of said relatively dense surface, said battery plates being arranged in said pouches so that plates of positive polarity are in said pouches having said relatively porous inner surfaces and plates of negative polarity are in said pouches having said relatively dense inner surfaces.

16. An improved battery plate assembly as in claim 13, said elongate sheet of needled polypropylene fabric comprising a pair of said sheets each having a relatively porous surface on one side of said grid forming a relatively high micron filter and a relatively dense surface on an opposite side of said grid forming a relatively low micron filter, said sheets being joined together back to back along their relatively dense surfaces so that each pouch of said side by side pouches has an inner relatively porous surface for closely conforming with the surfaces of said battery plates.

17. An improved battery plate assembly as in claim 13, said elongate sheet of needled polypropylene fabric having an inner layer of relatively dense polypropylene fibers and outer layers of relatively porous polypropylene fibers on opposite sides of said inner layer, so that each of said side by side pouches has an inner surface of relatively porous polypropylene fibers for closely conforming with the surfaces of said battery plates.

* * * * *